3,781,441
USE OF 4-CHLORO-3,5-DINITROBENZENE-
SULFONAMIDE AS A FUNGICIDE
Jerry H. Collins, Elizabeth, N.J., assignor to Esso
Research and Engineering Company
No Drawing. Original application May 1, 1970, Ser. No.
33,859, now abandoned. Divided and this application
Jan. 17, 1972, Ser. No. 218,611
Int. Cl. A01n 9/16
U.S. Cl. 424—321                                 1 Claim

ABSTRACT OF THE DISCLOSURE

Soil fungi are controlled with 4-chloro-3,5-dinitrobenzenesulfonamide.

---

This is a division of Ser. No. 33,859, filed May 1, 1970, now abandoned.

This invention relates to a process for the preparation of 4-chloro-3,5-dinitrobenzenesulfonamide. In another aspect, this invention relates to converting said 4-chloro-3,5-dinitrobenzenesulfonamide to $N^4,N^4$-disubstituted-3,5-dinitrosulfanilamides with secondary amines.

3,5-dinitro-$N^4,N^4$-di(n-propyl)sulfanilamide is a highly active pre-emergent herbicide. It has been claimed and described in U.S. Pat. 3,367,949, issued on Feb. 6, 1968, and assigned to Eli Lilly & Company. The preparation of this compound by the patented procedure is very laborious. Preparation of many analogous compounds by this procedure is most difficult.

The subject invention is directed to a novel process for preparing a novel intermediate which greatly simplifies the production of the compounds described in the above-identified patent as well as other compounds with pesticidal properties.

Accordingly, one object of this invention is to provide a process for the preparation of 4-chloro-3,5-dinitrobenzenesulfonamide.

Another object is to provide an improved process for the production of 3,5-dinitro-$N^4,N^4$-di(n-propyl)sulfanilamide and other 3,5-dinitro-$N^4,N^4$-disubstituted sulfanilamide.

Another object of this invention is to provide a novel intermediate compound useful in synthesis work and as a soil fungicide.

Other objects and advantages of this invention will become apparent to those skilled in the art from the following description and appended claim.

According to this invention, a process is provided for the production of 4-chloro-3,5-dinitrobenzenesulfonamide. Said process comprises the steps of dissolving 4-chloro-3,5-dinitrobenzenesulfonyl chloride in a solvent, said solvent being one or more members selected from the group ocnsisting of $C_3$–$C_8$ ketones, $C_2$–$C_8$ carboxylic acid esters, N,N-dimethylformamide, dimethylsulfoxide, and $C_4$–$C_8$ cyclic ethers; cooling the mixture to a temperature ranging from −50° C. to 10° C.; adding ammonia, either in its gaseous state or as a solution in one of the aforesaid solvents which may also contain water, at a rate sufficiently slow to permit the ammonia to react with the dinitrobenzenesulfonyl chloride compound as fast as it is added wherein the total amount of ammonia added amounts to two equivalents per equivalent of the said dinitrobenzenesulfonyl chloride reactant and then removing any excess ammonia.

It has been reported in the literature that the passage of ammonia gas through a hot benzene solution of 4-chloro-3,5-dinitrobenzenesulfonyl chloride gave two products which can be illustrated according to the following schematic equation:

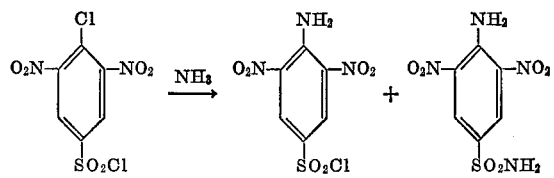

This reaction was described in the Journal of the American Chemical Society, vol. 77, p. 5652 (1955), by J. R. E. Hoover and A. R. Day. It is noted that in this reaction the compound 4-chloro-3,5-dinitrobenbenesulfonamide is not at all formed or at least was not at all detected. Under the prior art conditions the nuclear chlorine between the two nitro groups, hereafter identified as the 4-chlorine, was displaced prior to the chlorine being displaced on the sulfonyl group.

Under the conditions of the subject invention, the sulfonyl chloride is displaced without the 4-chlorine substituent being attacked.

One of the most critical conditions for successful selective amination is the use of a particular solvent. The solvents can be one selected from the group consisting of $C_3$–$C_8$ ketones such as acetone, $C_2$–$C_8$ carboxylic acid esters such as ethyl acetate, aprotic solvents such as N,N-dimethylformamide, and $C_4$–$C_8$ cyclic ethers such as tetrahydrofuran. Other solvents tested gave a mixture of products.

Another one of the critical factors in the process of the subject invention is that the mixture must be cooled to a temperature ranging from −50° to 10°, preferably between −20° and 5° prior to aminating the solution. Under these conditions it was discovered that the chlorine atom attached to the sulfonyl group was preferentially displaced to the exclusion of the displacement of the nuclear chlorine atom leading to the title compound. Below −50° C., the reaction does not take place and above 10° C., both chlorines are replaced at rates sufficiently similar such that the 4-chloro-3,5-dinitrobenzenesulfonamide is contaminated with increasing amounts of undesirable and difficultly separable 3,5-dinitrosulfanilamide.

The starting material in this process, 4-chloro-3,5-dinitrobenzenesulfonyl chloride, can be prepared according to the procedure set forth in Justus Liebig's Annalen der Chemie, vol. 366, p. 104 (1909), by F. Ullmann and E. Kuhn, or by such other procedures as will be apparent to those skilled in the art.

The 4-chloro-3,5-dinitrobenzenesulfonyl chloride is dissolved in one of the solvents enumerated hereinabove and the solution is then cooled to a temperature between −50° and 10° C. preferably from −20° to 5° C. Gaseous ammonia or a solution of ammonia in one or more of the solvents enumerated hereinabove which may also contain water is added to the solution. The addition rate can be varied depending on the stirring rate, reaction size, and the concentration of ammonia in the solvent added to the reactant solution. An appropriate rate can be visualized. That is, if ammonia is being added at a sufficiently slow rate the reaction mixture will exhibit at the point of addition a fleeting orange color which rapidly fades to a pale yellow color. If, on the other hand, the addition rate is excessive, the reaction mixture exhibits a red-orange color which does not fade upon standing. The total amount of ammonia added should not exceed two equivalents per equivalent of the sulfonyl chloride compound and any unused ammonia should be removed to facilitate product isolation.

The removal of ammonia can be done either by permitting it to escape from the solution under certain pressure conditions such that the partial pressure of ammonia is lower than the surrounding atmosphere, or it can be neutraliezd after addition is completed by the addition of any acid sufficiently acidic to convert ammonia to an ammonium ion, after which the ammonium salt can be filtered. It is to be understood that the method for removing the excess ammonia is not to operate as a limitation upon the subject process as any methods known to the art can be employed in this step.

The solution containing the 4-chloro-3,5-dinitrobenzenesulfonamide can then be dried if necessary. The drying step can be done with a conventional drying agent such as but not limited to magnesium sulfate, sodium sulfate and molecular sieves. The solution is then concentrated to constant weight and the sulfonamide product is recovered.

In many cases the product is pure enough to be used further but additional purification, if desired, can be carried out in a conventional manner such as the following: A solvent which will dissolve unreacted 4-chloro-3,5-dinitrobenzenesulfonyl chloride without dissolving the product 4-chloro-3,5-dinitrobenzenesulfonamide can be employed, such solvents include aromatic hydrocarbons such as benzene, toluene and the like. The solvents listed as critical in the conversion of the benzenesulfonyl chloride to the benzenesulfonamide are excluded but any other solvent could be used in this extraction step which would be obvious to those skilled in the art.

The final product, 4 - chloro-3,5-dinitrobenzenesulfonamide, is then separated by filtration. This compound has been found to possess soil fungicidal properties.

Fungicidal compositions of the invention are prepared by admixing the active ingredient defined heretofore, in fungicidally effective amounts with a conditioning agent of the kind used and referred to in the art as a pest control adjuvant or modifier to provide formulations adapted for ready and efficient application to soil using conventional applicator equipment.

Thus, the fungicidal compositions or formulations are prepared in the form of solids or liquids. Solid compositions are preferably in the form of granulars or dusts.

The compositions can be compounded to give homogeneous free-flowing dusts by admixing the active compound with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing the active ingredient with a suitable liquid diluent medium. With certain solvents, such as alkylated naphthalene or other aromatic petroleum solvents, dimethyl formamide, cycloketone, relatively high up to about 50% by weight or more concentration of the active ingredient can be obtained in solution.

The fungicidal compositions of the invention whether in the form of dusts or liquids, preferably also include a surface-active agent sometimes referred to in the art as a wetting, dispersing, or emulsifying agent. These agents, which will be referred to hereinatfer more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sufonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The fungicidal compositions are applied either as a spray, granular or a dust to the locus or area to be protected from undesirable fungal growth. Such application can be made directly upon the locus or area and the fungi thereon during the period of fungal infestation in order to destroy the fungi, but preferably, the application is made in advance of an anticipated fungal infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired fungicidal action. The amount of the active compound present in the compositions as actually applied for destroying or preventing fungi will vary with the manner of application, the particular fungi for which control is sought, the purpose for which the application is being made, and like variables. In general, the fungicidal compositions as applied in the form of a spray, dust or granular, will contain from about 0.1% to 100% by weight of the active compound.

Fertilizer materials, other fungicidal agents, and other pest control agents such as insecticides and herbicides can be included in the fungicidal compositions of the invention if desired.

The term "carrier" or "diluent" as used herein means a material, which can be inorganic or organic and synthetic or of natural origin, with which the active infredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals— although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the present nitrated aryl compound.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000 F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form and adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, or sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecylbenzenesulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the acive ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in an nonaqueous phase.

The present invention is further illustrated in greater detail by the following examples, but it is to be understood that the present invention in its broadest aspects, is not necessarily limited to terms of the reactants, or specific temperatures, residence times, separation techniques and other process conditions, etc.; or dosage level, exposure times, test plants used, etc. by which the compounds and/or compositions described and claimed are prepared and/or used.

EXAMPLE 1

A typical synthesis is given below.

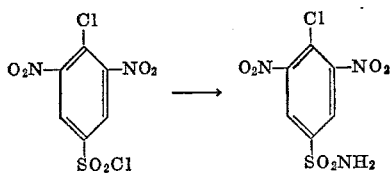

A solution of 4-chloro-3,5-dinitrobenzenesulfonyl chloride (60 g.) in acetone (500 ml.) was stirred and cooled to —15° in a Dry Ice-acetone bath. A solution of concentrated ammonium hydroxide solution (53.6 ml.) in 500 ml. of acetone was added drop-wise over two hours, keeping the temperature between —15° and —5°. Fifteen minutes after addition was completed, concentrated hydrochloric acid solution (5 ml.) was added, followed by anhydrous magnesium sulfate. The suspension was stirred, then filtered to remove magnesium sulfate and ammonium chloride. The acetone was removed. Benzene (200 ml.) was added, the suspension heated to reflux, then the product separated by filtration from the hot suspension; M.P. 185–189°.

Calcd. for $C_6H_4ClN_3O_6S$ (percent): C, 25.59; H, 1.43; N, 12.59. Found (percent): C, 25.26; H, 1.76; N, 12.66.

EXAMPLE 2

A solution of 4-chloro-3,5-dinitrobenzenesulfonyl chloride (30 g.) in tetrahydrofuran (500 ml.) was stirred and cooled to —10° in a Dry Ice-acetone bath. A solution of concentrated ammonium hydroxide solution (27 ml.) in 500 ml. of tetrahydrofuran was added dropwise over 2½ hours, keeping the temperature between —15° and —5°. One hour after addition was complete, 5 ml. of 5% hydrochloric acid solution was added, followed by anhydrous magnesium sulfate. After drying, the suspension was filtered to remove magnesium sulfate and ammonium chloride. The tetrahydrofuran was removed to yield the product; M.P. 192–196°. The melting point was not depressed by admixture with the product of the previous example.

One use of the claimed intermediate is to prepare $N^4$, $N^4$-disubstituted - 3,5 - dinitrosulfanilamide derivatives which exhibit useful pesticidal properties.

The following example further illustrates this use but it should be understood that the various reactants, amounts, temperatures, pressures and other conditions recited in these examples should not be construed so as to unduly limit this invention.

EXAMPLE 3

Preparation of $N^4,N^4$-di-n-propyl-3,5-dinitrosulfanilamide

N,N-di-n-propylamine (5.6 g., 0.05 mole), triethylamine (8 ml.), 4-chloro-3,5-dinitrobenzensulfonamide (14.1 g., 0.05 mole), and methanol (250 ml.) were mixed and the solution was maintained at reflux with efficient stirring. After eight hours the mixture was poured into water and extracted with benzene. The benzene solution was washed with dilute hydrochloric acid and water, dried with anhydrous magnesum sulfate, filtered, and concentrated. A purified sample had a M.P. of 132–133°.

Another use of the claimed 4-chloro-3,5-dinitrobenzenesulfonamide is a soil fungicide. The test procedure is given below.

EXAMPLE 4

Separate lots of sterilized soil are inoculated with Fusarium and Sclerotium. The inoculated soil is placed in 4 oz. Dixie cups and drenched with 20 ml. of a formulation containing sufficient chemical to give treatment rates of 100, 50, 25, 12.5 lbs./acre. The treated cups are incubated for 2 days at 70° F. The amount of mycelial growth on the soil surface is then rated on a scale of 0–10, where 0=no control and 10=complete control of mycelial growth.

Under these conditions the claimed 4-chloro-3,5-dinitrobenzenesulfonamide shows the following activity.

CONTROL OF SOIL FUNGI BY 4-CHLORO-3,5-DINITRO-BENZENESULFONAMIDE

| Pounds/acre | 100 | 50 | 25 | 12.5 |
|---|---|---|---|---|
| Organism: | | | | |
| Fusarium | 10 | 10 | 10 | 8 |
| Sclerotium | 10 | 9 | 8 | 6 |

What is claimed is:

1. A method of controlling soil fungi comprising contacting a soil environment containing said fungi with a fungicidally effective amount of 4-chloro-3,5-dinitrobenzenesulfonamide.

References Cited
UNITED STATES PATENTS 2,649,479  8/1953  Zickendraht ____ 260—556 AR
2,531,755  11/1950  Waleftsky _____ 424—321

OTHER REFERENCES

Chemical Abstracts, 1965, vol. 62, 14673h and 14674e.

ALBERT T. MEYERS, Primary Examiner

N. A. DREZIN, Assistant Examiner

U.S. Cl. X.R.
424—358